1938X
T. Bruff,
Shot Machine,
Patented June 4, 1813.
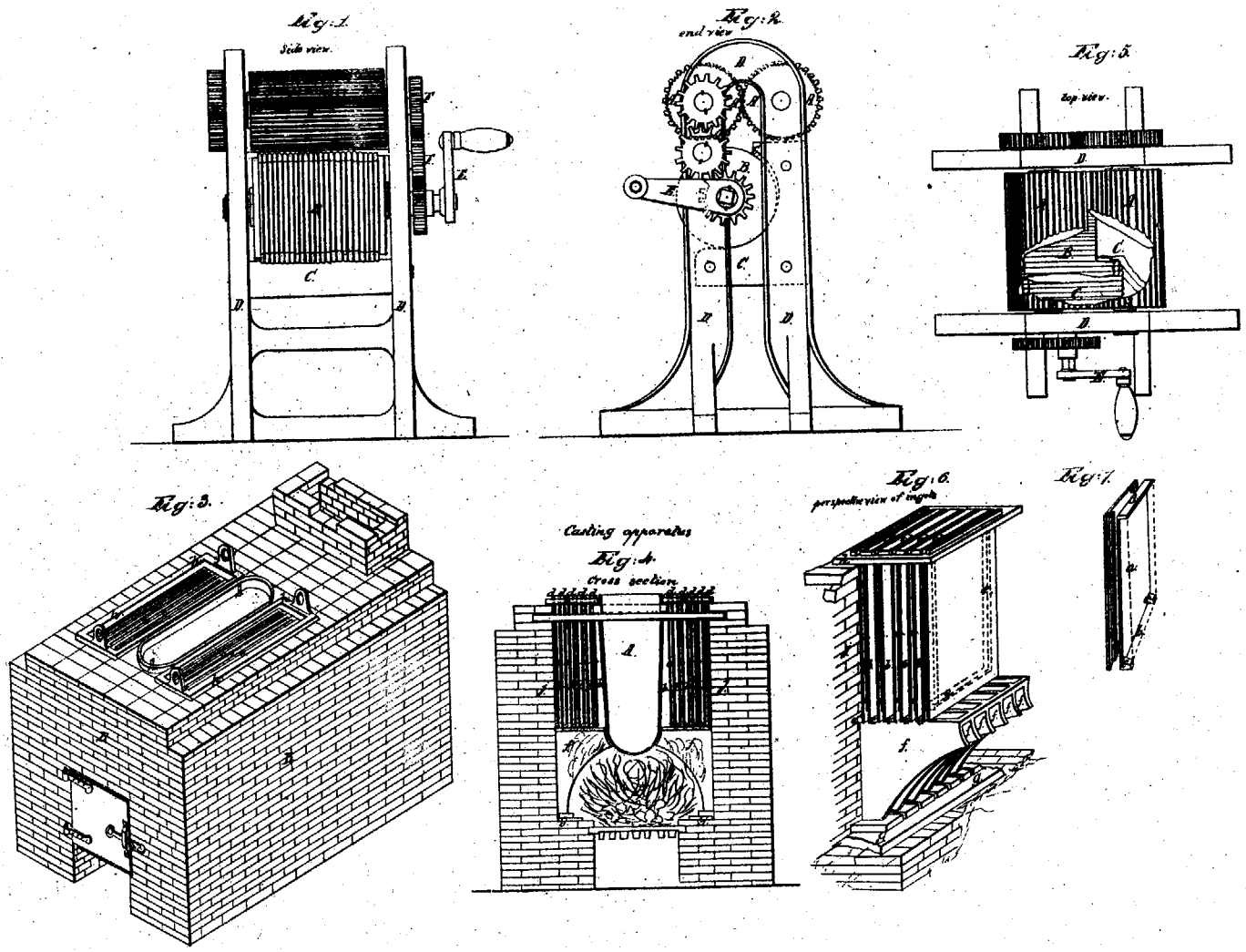

Thomas Bruff
Letters Patent

The Schedule referred to in these Letters Patent and making part
of the same containing a description in the words of the said Thom
as Bruff himself of his machine for making shot &c. by pressure This machine for making pressed shot from flat bars of lead con
sists of two slitting and one pressing roller with its curve all of steel,
case hardened iron, or hard brass, in a frame of metal. The slitting
rollers are placed horizontally at the top, are grooved lengthwise with
almost half circular grooves, a little widened at the top to let the
lead pass freely from them to the pressing part beneath. The grooves
in each roller, are exactly alike and facing each other all round.
so as to slit the bars cross wise almost as round as wire. Between
the grooves a plain space is left about the width of a small pin
head, where the lead between the wires is compressed to the size of
thin paper for the purpose of holding the pieces together till it con
ducts them to the mouth of the pressing Roller and curve. The
pressing Roller should be about a third larger than the slitting rollers,
and placed with the top or mouth of the curve immediately under
the dividing line between them, to receive the slitted bar as it comes
from them. This roller is grooved round its circumference in
perfect half circular grooves, so near each other as to bring the
metal almost to an edge between, and as many in number as
will comprise the width of the bar making them about a sixth
wider than the groove of the slitting rollers, to allow for the increase
of diameter of the shot as they are formed. On one side of the
pressing roller is the curve grooved like the roller with the grooves
facing each other, it is fixed to the frame and follows the cir
cle of the roller except a gradual widening from near the mid
dle to the top, leaving a space between at top sufficient to
receive one piece at a time of the leaden wire or slitted bar as they

1938X come from the slitting rollers. The length of the curve must be i
proportion to the size of the shot to be made by it, which to make
them perfectly round must be rolled over twice between the rol
and curve after it leaves the diverging and dividing part at
the top and the curve should be gradually turned a little out
at bottom, to give the shot an easy delivery from the grooves The slitting rollers have small cogs on one end to make th
keep pace with each other. and on the other end of one of them
and on one end of the pressing roller are two other coggs of equ
size, and when force is applied to the handle of the pressing ro
they all move together, and the pressing roller moves one third fas
than the slitting rollers in consequence of its greater diameter,
gives room for the pieces to move clear of each other. When the
slitting is performed by the upper rollers, and the bar suspen
from them by the thin plate between the slitted pieces to the m
of the pressing part the motion of the pressing roller draws them
into the mouth of the curve, takes them off one by one. divi
and rounds them into perfect shot and rolls them out at
the bottom of the machine. The casting apparatus consi
of iron ingots and a caldron set over a furnace for melting t
lead; and heating heating the ingots at the same time. The num
of ingots will depend on the number of bars to be cast at a m
they should be from two to two and a half feet in length, may
made of any width with divisions the exact breadth of the ba
intended to be cast, the breadth of the bars must correspond with
the length of the grooves in the slitting rollers and their thickness
the diameter of the shot intended to be made from them.

The ingots are made in two flat plates one of them plain, exc
a moulding at the the top and knob at bottom to keep the ne
one at a proper distance from it, the other like it, except a p
jection on the inside of the sides and bottom the thickness of the b
and about half an inch from the edges to admit of forming rubed in between them with the finger to keep them perfectly tight.
The moulding on the top and knob on the bottom, outside of the
ingots must be about half an inch deep to keep them far enough
asunder to admit the heat from the fire of the furnace to pass free
ly between them that they may be heated to the top. the tops must be
squared and leveled to form an even surface when set in their frame.
They are set perpendicularly on one or both sides of the caldron,
their bottoms resting on arches of cast iron in rows, pointing toward
the caldron with their feet on flat cast iron plates, placed horizon
tally with the bottom of the furnace. the upper edges of these arches
straight that the ingots may stand perfectly level on them; the ingots
are inclosed in a light iron frame at top. and the wall of the furnace
on the outside and ends. If the dipping ladle and striker are
used; the top of the caldron may be almost level with the tops of
the ingots and the bars when drawn may be trimmed to the [illegible]
in a guage box. with a cutter like a draw knife working on [illegible]
When draws are necessary for nicer work they may be of cast iron
or brass. and large enough to cover all the ingots on one side
of the Caldron or in convenient divisions each draw consists of
a flat plate to rest on the tops of the ingots having holes pierced
in them corresponding in size and form with the open tops
of the ingots and directly over them. they must have a high edg
ing around them to keep in the superfluous lead; the lead to be
discharged from a spout or cock over each draw. and when the ingots
are charged, the draw must be moved forward a little more than the
breadth of the holes and left to cool. To use this machine it
is only necessary when a moderate force is applied to feel the end
of a bar made as above directed; into the mouth of the conduct
or at top and you have nothing to do but to receive the shot into
a bag or Box at bottom. By adding a wooden frame with a
sloping bottom toward the conducting groove. You may place
almost any number of bars reclining against the first and they will succeed each other in passing the diameter and will
worked into shot in succession. To give the shot a high
ish, the method used in the deep footing is sufficient;
turn them gently in a large iron cylinder, about two x
ules with a little powder of black lead Witnesses
William Thornton
Geo. Lyon Thos. Brett.

Drawing Mark
N.W.S.

(1250 words)

(Patented 4th June 1813)

1938